(12) United States Patent
Smith et al.

(10) Patent No.: US 9,729,180 B2
(45) Date of Patent: Aug. 8, 2017

(54) SYSTEM AND METHOD FOR PROVIDING SERVICE LICENSE AGGREGATION ACROSS MULTIPLE DEVICE SIM CARDS

(71) Applicant: BlackBerry Limited, Waterloo (CA)

(72) Inventors: Andrew Christopher Smith, Oakville (CA); Richard Eric Nicolaisen, Waterloo (CA); Piotr Madej, Mississauga (CA); Jia-Lin Chin, Scarborough (CA)

(73) Assignee: BlackBerry Limited, Waterloo, Ontario (CA)

( * ) Notice: Subject to any disclaimer, the term of this patent is extended or adjusted under 35 U.S.C. 154(b) by 68 days.

(21) Appl. No.: 14/540,889

(22) Filed: Nov. 13, 2014

(65) Prior Publication Data
US 2016/0142086 A1     May 19, 2016

(51) Int. Cl.
*H04B 1/38* (2015.01)
*H04W 12/06* (2009.01)
*H04W 8/18* (2009.01)
*H04B 1/3816* (2015.01)
*H04L 29/06* (2006.01)

(52) U.S. Cl.
CPC ....... *H04B 1/3816* (2013.01); *H04L 63/0853* (2013.01); *H04W 8/18* (2013.01); *H04W 12/06* (2013.01); *H04W 8/183* (2013.01)

(58) Field of Classification Search
CPC ..... H04W 88/06; H04W 48/18; H04W 4/001; H04W 4/003; H04W 88/02; H04L 63/10; G06F 15/8007; H04B 1/3816; H04B 1/3818

USPC ................................. 455/558, 435.1, 435.2
See application file for complete search history.

(56) References Cited

U.S. PATENT DOCUMENTS 6,167,271 A * 12/2000 Parker ................... H04W 92/02
                                                                 455/445
2005/0107114 A1    5/2005 Ocock
(Continued)

FOREIGN PATENT DOCUMENTS

CN          101184293       5/2008

OTHER PUBLICATIONS

International Search Report and Written Opinion dated Feb. 17, 2016, received for International Application No. PCT/CA2015/051177.

*Primary Examiner* — Allahyar Kasraian
(74) *Attorney, Agent, or Firm* — Donna Flores; Fleit Gibbons Gutman Bongini & Bianco P.L.

(57) ABSTRACT

A system, a computer program product and a method associate service licenses with a wireless device. A device identifier (device ID) which identifies the wireless device and a Subscriber Identity Module identifier (SIM ID) identifying a SIM card currently inserted in the wireless device are received. If the SIM ID is not currently associated with the device ID, a listing of service licenses associated with the SIM ID is aggregated with a listing of service licenses associated with the device ID. The wireless device is authorized to use service licenses listed in the aggregate listing of service licenses. If the SIM ID was currently associated with a second device ID, the service licenses associated with the SIM ID are removed from a listing of service licenses associated with the second device ID and the second wireless device is deauthorized from using these service licenses.

23 Claims, 4 Drawing Sheets

(56) References Cited

U.S. PATENT DOCUMENTS

| | | | |
|---|---|---|---|
| 2007/0131780 A1* | 6/2007 | Ho | G06K 19/07 235/492 |
| 2010/0248690 A1 | 9/2010 | Biggs et al. | |
| 2011/0105080 A1* | 5/2011 | Haughn | G06F 21/335 455/411 |
| 2011/0306318 A1* | 12/2011 | Rodgers | H04W 8/183 455/410 |
| 2012/0309353 A1* | 12/2012 | Markov | H04W 8/183 455/411 |

* cited by examiner

SYSTEM AND METHOD FOR PROVIDING SERVICE LICENSE AGGREGATION ACROSS MULTIPLE DEVICE SIM CARDS

BACKGROUND OF THE INVENTION

Field of the Invention

The present invention relates to a mobile service licensing and more particularly to a system and method for providing service license aggregation across multiple device SIM cards.

Description of the Related Art

Mobile devices may currently be provisioned with licenses for different services or service packages available on a wireless network. Many of these services may be offered by the carrier and charged to the customer on a per service level, or bundled with different service options. Often, service licenses are associated with a SIM (Subscriber Identity Module) card. However, when a user swaps SIM cards from a given device for various reasons, such as changing network access when traveling to different geographic locations, the service licenses associated with the original SIM card may not be accessible.

BRIEF DESCRIPTION OF THE SEVERAL VIEWS OF THE DRAWINGS

The details of the present disclosure, both as to its structure and operation, may be gleaned in part by study of the accompanying drawings, in which like reference numerals refer to like parts, and in which.

DETAILED DESCRIPTION

An aspect of the present disclosure provides for a system, a computer program product and a method of associating service licenses with a wireless device. A device identifier (device ID) which identifies the wireless device and a Subscriber Identity Module identifier (SIM ID) identifying a SIM card currently inserted in the wireless device are received. If the SIM ID is not currently associated with the device ID, a listing of service licenses associated with the SIM ID is aggregated with a listing of service licenses associated with the device ID to create an aggregate listing of service licenses. The aggregate listing of service licenses is associated with the device ID. The wireless device is authorized to use service licenses listed in the aggregate listing of service licenses.

In accordance with another aspect of the present disclosure, a swap from one SIM card to another SIM card is detected. The first SIM card enables usage of a first wireless network and the other SIM card enables usage of a second wireless network.

In accordance with another aspect, the device ID and the SIM ID associated with the wireless device are received upon activation of the wireless device. According to yet another aspect, periodic requests to receive the device ID and the SIM ID associated with the wireless device may be performed.

In accordance with yet another aspect, the listing of service licenses associated with the device ID may be stored in a database as subscriber service profiles (SSP). The listing of service licenses associated with the device ID is replaced in the database by the aggregate listing of service licenses in the database, as a new listing of service licenses associated with the device ID.

In accordance with another aspect of the present disclosure, if the SIM ID is determined to be currently associated with a different device ID identifying a second wireless device, the service licenses associated with the SIM ID are identified and removed from a listing of service licenses associated with the second device ID. The second device ID is disassociated with the service licenses associated with the SIM ID and the second wireless device is deauthorized from using service licenses associated with the SIM ID.

Figure 1:
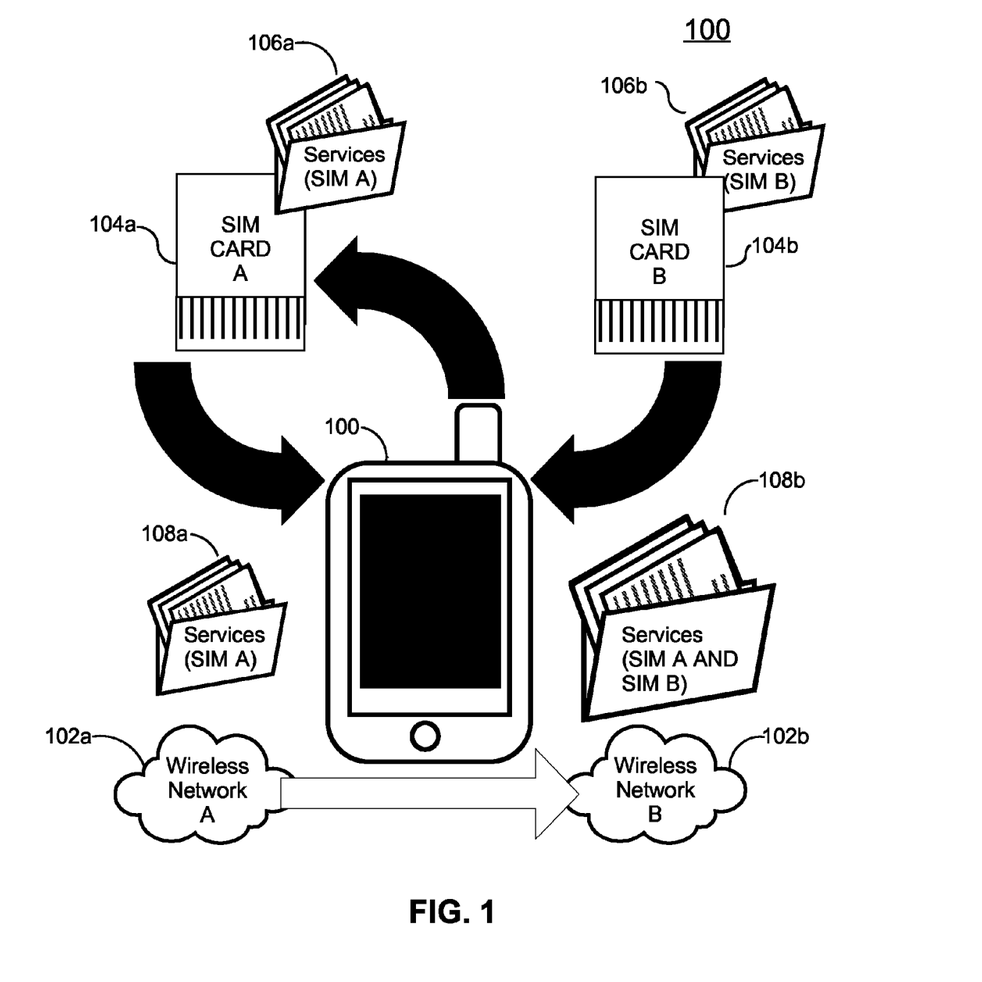
FIG. 1 is a block diagram illustrating an example process for aggregating service licenses associated with different SIM cards in a wireless device according to one aspect of the present disclosure.

Referring now to FIG. 1, one example of a wireless device 100 operating on a first wireless network A 102*a* using SIM card A 104*a* is shown. Wireless network A 102*a* is typically a cellular network using standard communication protocols, such as Global System for Mobile Communication (GSM), Third Generation Partnership Project (3GPP), Universal Telecommunications System (UMTS), or 3GPP Long Term Evolution (LTE). The wireless device 100 is authorized to use a set of subscriber services A 106*a* associated with SIM card A 104*a* through its SIM ID. It should be noted that each SIM may be identified through a variety of identifiers, such as an integrated circuit card identifier (ICCID) an International Mobile Subscriber Identity (IMSI), or any other unique identifier that may be associated with a specific SIM card. The terms "SIM ID" or "SIM identifier" as used herein, is used to reference any of these identifiers. These services are additionally associated with a device ID of the wireless device 100 as device services 108*a* and both sets of services (i.e. subscriber services A 106*a* and device services 108*a*) are stored in a database accessible to or part of wireless network A 102*a*.

In some instances, the user may decide to swap SIM card A 104*a* for a new SIM card B 104*b*, for example, if the user travels to a different geographical location having a wireless network B 102*b* serviced by a different carrier than wireless network A 102*a*. Wireless network B 102*b* may also be a cellular network using well-known communication protocols, like wireless network A 102*a*, however, wireless network A 102*a* and wireless network B 102*b* may use different protocols than each other. SIM card B 104*b* may be associated with a different set of subscriber services 106*b* than those associated with SIM card A 104*a*, yet the user may still need or want the services associated with SIM card A 104*a*. To ensure that the wireless device 100 does not lose services due to the SIM card swap, services associated with the newly inserted SIM card B 104*b* are aggregated with those device services already associated with the device ID for wireless device 100 and stored as device services 108*b* in a database accessible to or part of wireless network B 102*b*. In this manner, both the services authorized through SIM card B 104*b* and the services authorized by SIM card A 104*a* remain authorized to wireless device 100.

Figure 2:
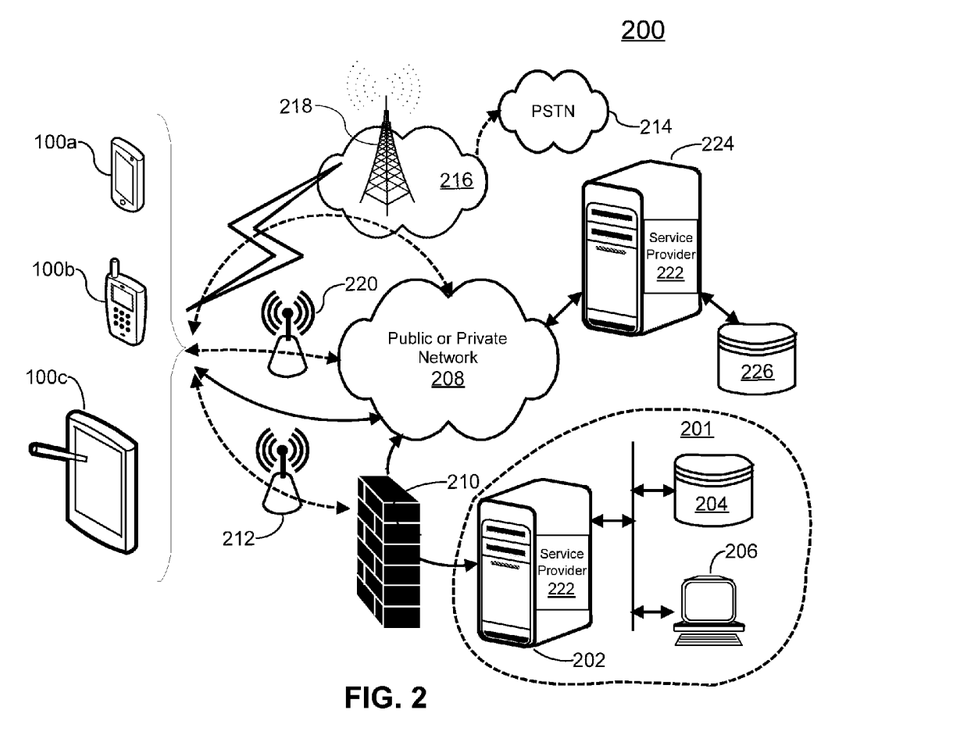
FIG. 2 is a schematic diagram of an example network for use in aggregating service licenses according to one aspect of the present disclosure.

FIG. 2 illustrates an example of a possible network topology 200 that may be used with the example wireless device 100. It will be understood by those skilled in the art that the schematic of FIG. 2 is merely representative of only particular aspects of a network, and omits other components that are typically included for ease of exposition, such as peripheral devices, routers, mobile data servers, and the like; and further, that the network illustrated herein may include different components and/or be arranged in different topologies than that shown in FIG. 2. A host system 201 may be provided, which can be an own-premises local area network (LAN), or wide area network in communication with LANs, with local computing resources such as one or more servers 202, one or more data repositories 204 and client devices 206 such as terminals or workstations. The servers 202 and data repositories 204 represent controllers, security and information technology policy modules, application servers, messaging servers, file servers, databases, memory devices and the like for providing services to users over the LAN and also over the public or private network 208 to users at their respective electronic devices, and to transmit data to destinations and receive data from outside the host system 201 over the network 208. The host system 201 and its elements will include, as will be appreciated by those skilled in the art, those components generally included in such devices, such as communication subsystems for communicating over one or more fixed or wireless networks, one or more processors, data stores, disk arrays, and the like. The services can include but are not limited to messaging, directory services, collaborative applications, calendaring applications, search engines, file servers, identity, encryption, compression, security, mobile device management, external system integration and secure access to intranet resources (e.g., virtual private networks (VPNs)), and it will be appreciated by those skilled in the art that the various network components 202, 204, 208 will be adapted for use with those services.

Messaging services can be implemented using one or more servers 202 provided with means for storing messages (e.g., a database or a suitable data repository 204) for each message service or format available using the host system 201, such as email, instant messaging, voicemail, and the like. The host system 201 may be maintained by and confined to a single enterprise, an individual or a group of enterprises/individuals. The server 202 (or a plurality of such servers) and its corresponding data repository 204 can therefore store all received and sent messages on behalf of each user, whether those messages originated inside or outside the host system 201. In some embodiments, messages sent and received by a user may be stored only locally on the user's client device and not maintained in a persistent store in the host system 201, while in other embodiments the messages are stored both locally at the client device as well as the server, in which case the message data stores on the client device and the server are synchronized or reconciled periodically. The user device may be any suitable computing or communication device adapted for composition and transmission of messages such as the client devices 206 or wireless devices 100*a*, 100*b*, 100*c* illustrated in FIG. 2. In fact, a single user may use multiple devices 205, 100*a*, 100*b*, 100*c* to access the host system 201 services. For ease of reference, a single device 100 is referred to although it will be appreciated by the reader that these embodiments may be implemented using each of these multiple devices.

The host system 201 may operate from behind a firewall or proxy server 210, which provides a secure node and optionally a wireless internet gateway for the host system 201. Client devices such as the wireless device 100 can then access the host system 201 wirelessly through the firewall or proxy server 210, as denoted by the access point 212. External access to the host system 201 by devices 100 may also be provided via a public or private network 208. The device 100 may be configured to access the public switched telephone network 214 through a wireless network 216, which may comprise one or more nodes 218 configured for communication in accordance a suitable mobile telephony standard. In turn, the wireless network 216 provides the electronic device 100 with connectivity to the Internet or other public wide area network 208, and thence to the organization's host system 201. Alternatively or additionally, if the mobile device is provisioned to communicate over wireless networks that are typically IP-based, such as wireless LANs implementing the Wi-Fi protocol (one or more of the IEEE 802.11 suite of protocols), personal area networks implementing other protocols such as Bluetooth, other wireless networks implementing wireless broadband standards such as WiMAX (one or more of the IEEE 802.16 suite of protocols), and the like, the mobile device 100 accesses the public or private wide area network 208 through a third-party access point, such as the user's own personal access point and Internet connection, or a third party hotspot device, as denoted by the access point 220.

The services above, such as directory services and messaging, can be provided in a self-hosted system as suggested above, i.e., a host system 201 supplied by and managed by the organization itself. The host system 201 may include a service provider 222, such as a mobile device management system, functioning to provide services for a wireless device 100. Operation of the service provider 222 is discussed in further detail below. However, the person skilled in the art will appreciate that one or more services provided to organization users may instead by provided by third parties in software as a service, platform as a service, or infrastructure as a service arrangement, colloquially referred to as cloud computing services. For example, messaging and provisioning services can be hosted by a third party service maintaining an external enterprise server 224 and data repository 226, and the service provider 222 may be included as part of the enterprise server 224 or at some other location within the network 200. Access to the external enterprise server 224 can be made available both externally to external client devices such as the wireless device 100, and to client devices 206 within the host system's 201 LAN over the public or private network 208. Regardless, the host system's 201 own network services are made available only to those users who possess sufficient credentials to access the services, whether they are accessed internally or externally, and whether provided by the self-hosted or the virtually (externally) hosted system. Messaging services in particular are accessible by the users through client messaging applications executing on the users' devices 100 which communicate with a message server such as the server 202 or 224.

The wireless device 100*a*, 100*b*, 100*c*, other client device 206, and/or the server 202, 224 (or another computing device in the host system 201) may be configured to implement the methods described herein.

Figure 3:
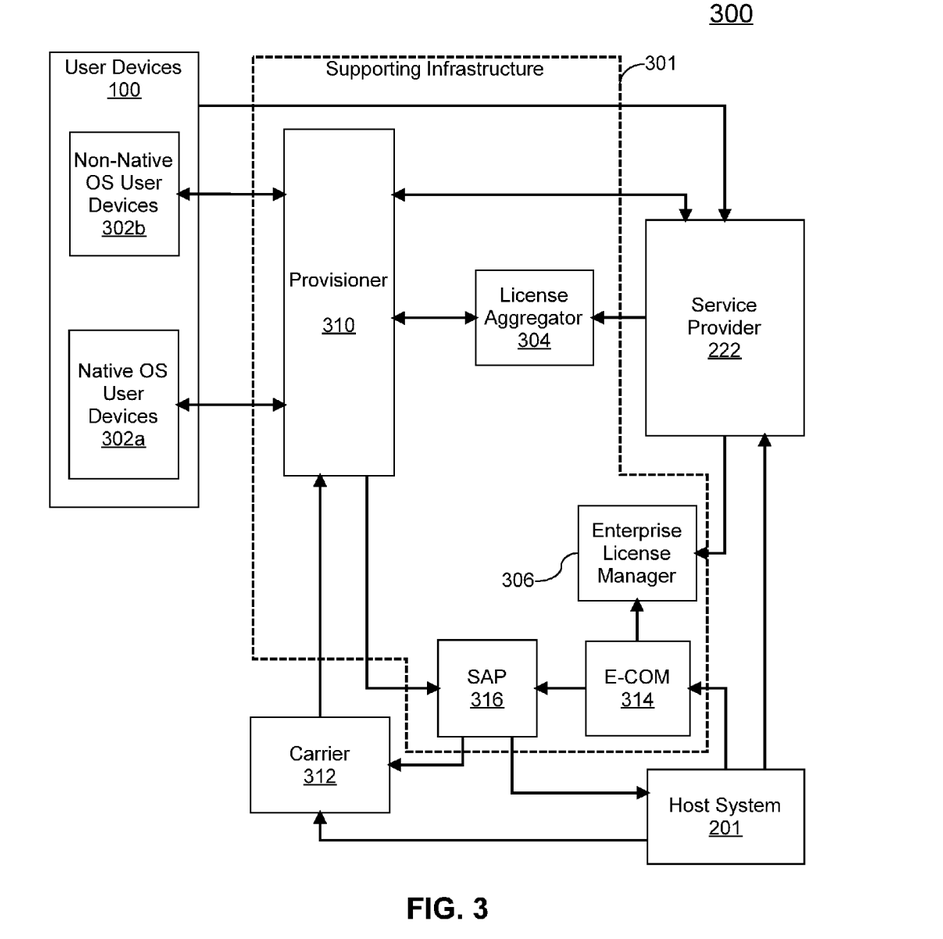
FIG. 3 is a block diagram of an example license aggregation system including a service provider and supporting infrastructure operating to provide services, associate these services with a wireless device and verify licensing requirements for these services in accordance with one aspect of the present disclosure.

Referring now to FIG. 3, a block diagram of an example service provider 222 and supporting infrastructure 301 operating to provide services, associate these services with a wireless device 100 and verify licensing requirements for these services in a license aggregation system 300 is provided. The service provider 222 may operate with wireless devices 100 that have a native operating system 302a (i.e. designed specifically to operate within the framework of the service provider 222 and supporting infrastructure 301) or a non-native operating system 302b (i.e. designed to operate using a different operating system without consideration for the service provider 222 and supporting infrastructure 301).

The supporting infrastructure 301 maintains device-to-SIM associations. These associations are established and maintained through reports sent by a provisioner 310 based on notifications received from a service provider 222 that indicate a given SIM is present in the device 100 while being provided service from the service provider 222. The service provider 222 is responsible for making requests and sending notifications to the supporting infrastructure 301 to determine current licenses available, provide enforcement based on available licenses, and send updates notifying infrastructure about active device/SIM pairings. The service provider 222 may be any entity that provides a service, such as an application on the wireless device, a desktop application, a remote application provided on a server within the network, or any provider of service that can fulfill the above contract.

The service provider 222 is responsible for determining whether or not a wireless device 100 has a sufficient license to satisfy a request, such as a request to activate a service (i.e. an entitlement request) or a request to continue to use the service (e.g., check every X minutes/hours/days to see if the client still has service).

The use of any service provided by the service provider 222 to the wireless device 100 may be licensed. For example, after activation the wireless device 100 may be enabled for use of a secure collaboration service. The service provider 222 may also provide conferencing functionality, use of external system integration such as application stores, etc. Any service that the service provider 222 provides for may be enabled after activation. The service may also be licensed on a per request basis rather than an unlimited enablement of the wireless device 100 for the service.

The service provider 222 pulls or receives device IDs and SIM IDs from the wireless device 100 and supplies these IDs to a license aggregator 304, which is a container that stores and searches for listings of service licenses associated with the device IDs and SIM IDs. Each listing may be stored as a Subscriber Service Profile (SSP), which is an XML document containing a set of licenses associated with a particular device ID.

The license aggregator 304 provides the service provider 222 with an aggregate SSP of all licenses associated with the wireless device 100 (i.e. each SIM card currently associated with the device), in addition to the SIM currently inserted in the device, if not already associated with the device. The aggregate SSP for a device, at any point in time, is the set of service licenses associated with each SIM card that has been in the device 100 while being provided service by a service provider 222 and not subsequently inserted into another device being provided service by a service provider 222. The aggregate SSP can be assembled according to the current associations of SIM cards to a given device. When activating a device 100, a new SIM card may be inserted at the time of activation. In this case, the licenses associated with the device 100 are for SIMs previously in the device while managed by a service provider 222, but would not include the licenses associated with the SIM card currently in the device. As the service provider 222 provides access to licenses for all SIM cards, past and present, the licenses associated with the device ID and with the SIM currently in the device are aggregated. After activation, the device-to-SIM association is established for the newly inserted SIM card by notification received from the service provider, and therefore that SIM's licenses are returned in association with the device ID at the next request.

If the wireless device 100 does not have sufficient licenses to fulfill the request, the service provider 222 may fall back on a pool of licenses obtained from the enterprise license manager 306. The licenses maintained by the enterprise license manager 306 are not associated with any particular device and are available to grant access to services through the service provider 222. Otherwise, the service provider 222 may allow access to certain services for a temporary grace period.

Upon successful activation by the service provider 222, the service provider 222 sends information to a provisioner 310 including the device ID, the SIM ID, and a code indicating the request status (e.g., activation on a specific service provider 222, a SIM swap, a request to use a certain service, etc). The provisioner 310 evaluates and interprets the request and determines that the wireless device 100 has the specific SIM card while activated on service provider 222 and updates device-to-SIM relationships. The service provider 222 may also periodically perform a license sync for all devices (and their current SIM) under management in order to determine if the use of service continues to be licensed/authorized.

The provisioner 310 may also receive license updates from a carrier 312 when services are purchased or added on by the host system 201. Additionally, the provisioner 310 may receive license updates reflecting licenses purchased via e-commerce 314 and provided via a systems, applications and products (SAP) system 316. The provisioner 310 aggregates all licenses currently associated with the wireless device 100 and pushes the resulting SSP back to the license aggregator 304.

Although the service provider 222, the license aggregator 304, the enterprise license manager 306 and the provisioner 310 are shown in FIG. 3 as separate blocks, it should be noted that all or some of the components may be co-located on a single physical machine or distributed across a network. Additionally, although a single service provider 222 is shown, the license aggregation system 300 may include a multiplicity of service providers 222, each service provider 222 capable of providing services for a multiplicity of host systems 201 and user devices 100.

Figure 4:
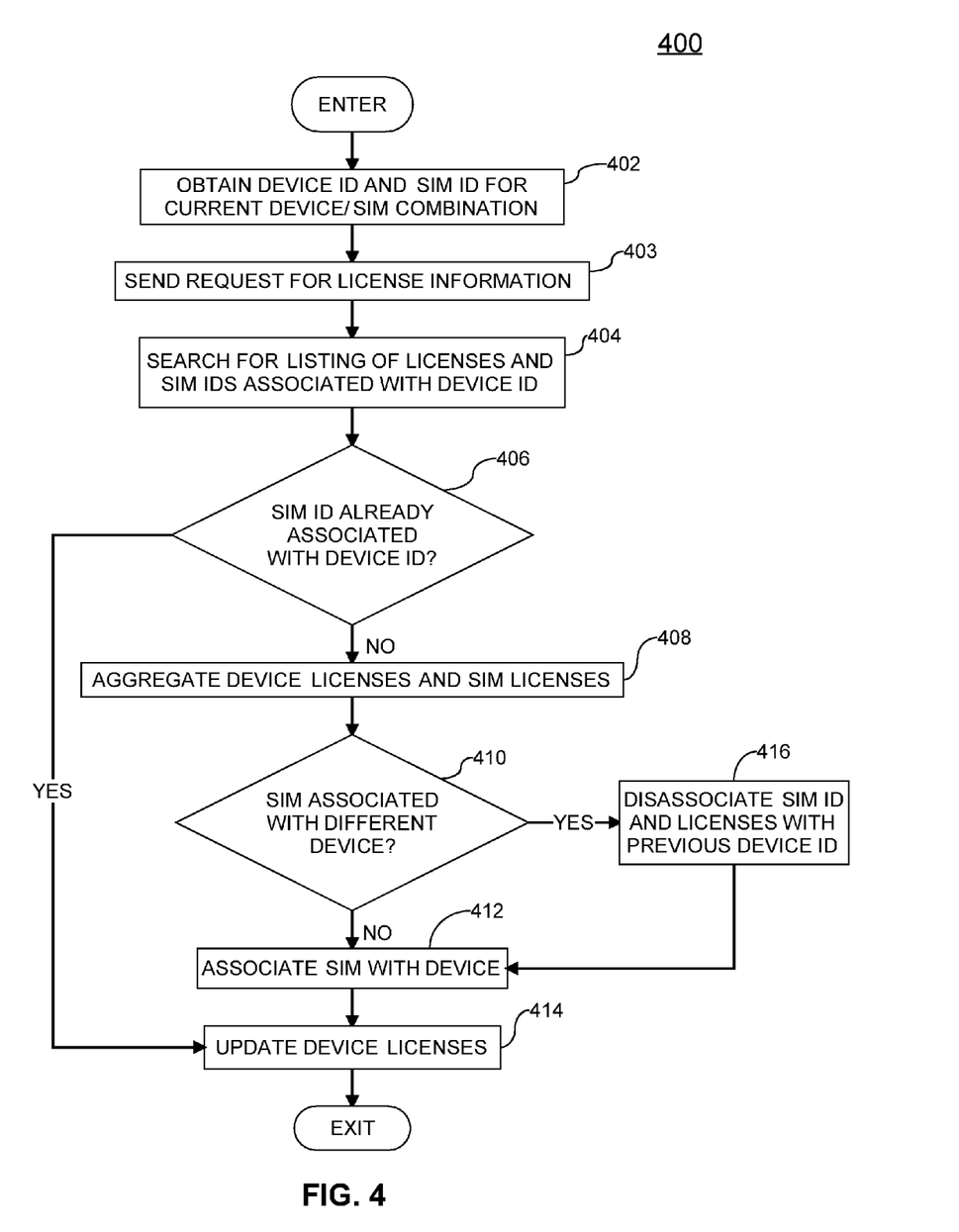
FIG. 4 is a flowchart illustrating an example process for provisioning services on a wireless device authorized by services associated with multiple SIM cards in accordance with one aspect of the present disclosure.

Turning now to FIG. 4, a flowchart is provided illustrating an example method of associating service licenses with a wireless device 100. The device ID of the wireless device 100 and a SIM ID for the SIM card currently inserted in the wireless device 100 are obtained (at step 402) by the service provider 222. The service provider 222 sends (at step 403) a notification to the license aggregator 304 to provide a listing of services associated with the device ID. The notification may be sent in response to a request for activation, in response to a request to use or continue using a particular service, upon a successful activation event, periodically to verify and sync licenses, or other events (e.g., a SIM swap).

Upon receipt of notification from the service provider 222, the license aggregator 304 searches (at step 404) for a listing of licenses and SIMs IDs associated with the device ID. In one example, the service provider 222 obtains the device ID and the SIM ID from the wireless device 100 and makes a "GET" request to the license aggregator 304 supplying all identifiers as arguments. The listing of licenses associated with the device ID may be stored as an SSP.

If the SIM ID is not currently associated (at step 406) with the device ID, (i.e. has not already been activated or a SIM card swap is detected), the license aggregator 304 aggregates (at step 408) the SIM licenses authorized by the current SIM card with the device ID licenses included in the device ID SSP on the fly and returns the aggregate list to the service provider 222. It should be noted that the device ID SSP is the aggregate of all SSPs for SIM cards currently associated with the wireless device 100. The service provider 222 persists the SSP response in its database and evaluates the response SSP to determine if the license is sufficient for the request.

If the SIM ID is not currently associated (at step 410) with another device ID, the service provider 222 notifies the provisioner 310 of the new device/SIM card combination and the provisioner 310 associates (at step 412) the new SIM ID with the device ID. The provisioner 310 updates (at step 416) the device ID SSP by aggregating the device ID SSP with the service licenses associated with the SIM ID and replaces the SSP for the device in the license aggregator 304 with the updated SSP. In response to a new request from the service provider 222, the license aggregator 304 returns the updated device ID SSP to the service provider 222. Thus, the wireless device 100 is now authorized to use the services associated with the device ID.

Note that a SIM card is associated with a wireless device if it is inserted at any point where the wireless device has connectivity to the service provider 222 and has not since been inserted into another device with connectivity to a service provider 222. In this manner, a wireless device 100 may be associated with any number of SIM IDs whenever a SIM card is inserted into the wireless device 100 that is active upon a service provider 222, as long as that SIM card has not been subsequently inserted into a different device being provided a service by a service provider 222.

Returning to decision block 410, if the SIM ID is currently associated (at step 410) with another device ID, the service provider 222 notifies the provisioner 310 that the relationship no longer is valid and the provisiner 310 disassociates (at step 416) the SIM from that device. The provisioner 310 identifies the service licenses associated with the SIM ID, removes the service licenses associated with the SIM ID from a listing of service licenses associated with the second device ID (i.e. the second device ID SSP) and pushes the second device ID SSP to the license aggregator 304. The second wireless device is no longer able to use services associated with the SIM ID (i.e. the second wireless device is deauthorized). As described above, the service provider 222 notifies the provisioner 310 of the new device/SIM association and the provisioner 310 associates (at step 412) the new SIM ID with the device ID and the provisioner 310 updates (at step 414) the current device ID SSP by aggregating the device ID SSP with the service licenses associated with the SIM ID and replaces the device ID SSP in the license aggregator 304 with the updated SSP. Thus, the wireless device 100 is now authorized to use the services associated with the device ID.

Returning to decision block 406, if the SIM ID is already associated with the device ID, the process ends. In this case, the license aggregator 302 returns the current device ID SSP to the service provider 222 in response to a request or notification. The service provider 222 re-evaluates the features used by each device to determine if their licenses are sufficient. This process may be repeated periodically at predetermined intervals or manually upon request. This periodic evaluation ensures that the service provider 222 is aware of any changes in any SSP associated with the device ID or SIM IDs as can occur if the provisioning of the SIM changes.

Figure 5:
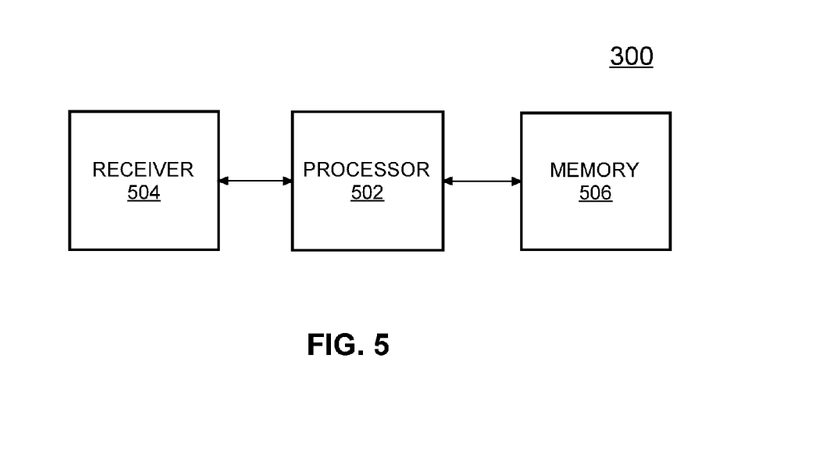
FIG. 5 is a block diagram of hardware components of an example mobile device management system in accordance with an aspect of the present disclosure.

Turning now to FIG. 5, a block diagram of an example license aggregation system 300 is provided. The license aggregation system 300 may be implemented on a computer or group of computers comprising at least a processor 502, a receiver 504 and a memory 506 containing a database. The receiver 504 receives data from wireless devices 100, such as but not limited to, device IDs and SIM IDs. The memory stores, among other things. SSPs for a multiplicity of device IDs and SIM IDs. The processor 502 is communicatively coupled to the memory 506 and the receiver 504 and executes the methods and processes described above. One skilled in the art will recognize that components of the license aggregation system 300 not relevant or essential to the operation of the system as described herein are well known in the art and thus not described in detail.

The present invention may be embodied within a system, a method, a computer program product or any combination thereof. The computer program product may include a computer readable storage medium or media having computer readable program instructions thereon for causing a processor to carry out aspects of the present invention. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing.

A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Finally, the terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising." when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to embodiments thereof, it will be apparent that modifications and variations are possible without departing from the scope of the invention defined in the appended claims as follows:

We claim:

1. A method of associating service licenses with a wireless device, the method comprising:
   receiving a first device identifier identifying the wireless device and a first Subscriber Identity Module (SIM) identifier identifying a first SIM card currently inserted in the wireless device;
   determining whether the first SIM identifier is currently associated with the first device identifier; and
   if the first SIM identifier is not currently associated with the first device identifier:
      aggregating a listing of service licenses associated with the first SIM identifier with a listing of all service licenses currently associated with the first device identifier, the services licenses being associated with multiple SIM cards previously inserted in the wireless device while being provided service by a service provider and not subsequently inserted into a second wireless device being provided service by a service provider, to create an aggregate listing of service licenses; and
      associating the first device identifier with the aggregate listing of service licenses.

2. The method of claim 1, further comprising authorizing the wireless device to use service licenses listed in the aggregate listing of service licenses.

3. The method of claim 1, further comprising detecting a swap from a second SIM card to the first SIM card currently inserted in the wireless device.

4. The method of claim 3, wherein the first SIM card currently inserted in the wireless device enables usage of a first wireless network and the second SIM card enables usage of a second wireless network.

5. The method of claim 1, further comprising periodically requesting to receive the first device identifier and the first SIM identifier associated with the wireless device.

6. The method of claim 1, wherein the first device identifier and the first SIM identifier associated with the wireless device are received upon activation of the wireless device.

7. The method of claim 1, wherein the listing of service licenses associated with the first device identifier is stored in a database as a subscriber service profile.

8. The method of claim 1, wherein the listing of service licenses associated with the first device identifier is stored in a database, the method further comprising replacing the listing of service licenses associated with the first device identifier with the aggregate listing of service licenses in the database, as a new listing of service licenses associated with the first device identifier.

9. The method of claim 1, further comprising:
determining whether the first SIM identifier is currently associated with a second device identifier identifying a second wireless device; and
if the first SIM identifier is currently associated with the second device identifier:
identifying the service licenses associated with the first SIM identifier;
removing the service licenses associated with the first SIM identifier from a listing of service licenses associated with the second device identifier; and
disassociating the second device identifier with the service licenses associated with the first SIM identifier.

10. The method of claim 9, further comprising deauthorizing the second wireless device from using service licenses associated with the first SIM identifier.

11. The method of claim 1, further comprising:
determining that a second SIM card having a second SIM identifier, has been inserted into a second wireless device; and
determining that the second SIM identifier is currently associated with the first device identifier;
identifying all service licenses associated with the second SIM identifier; and
disassociating the service licenses associated with the second SIM identifier from the aggregate listing of services licenses associated with the first device identifier.

12. A system for associating service licenses with a wireless device, the system comprising:
a receiver that receives a first device identifier identifying the wireless device and a first Subscriber Identity Module (SIM) identifier identifying a first SIM card currently inserted in the wireless device;
a database storing an aggregate listing of all service licenses associated with the first device identifier, the services licenses being associated with multiple SIM cards previously inserted in the wireless device while being provided service by a service provider and not subsequently inserted into a second wireless device being provided service by a service provider; and
a processor, communicatively coupled with the receiver and the database, the processor configurable to:
determine whether the first SIM identifier is currently associated with the first device identifier; and
if the first SIM identifier is not currently associated with the first device identifier:
aggregate a listing of service licenses associated with the first SIM identifier with the listing of all service licenses currently associated with the first device identifier to create the aggregate listing of service licenses; and
associate the first device identifier with the aggregate listing of service licenses.

13. The system of claim 12, wherein the processor is further configurable to authorize the wireless device to use service licenses listed in the aggregate listing of service licenses.

14. The system of claim 12, wherein the processor is further configurable to detect a swap from a second SIM card to the first SIM card currently inserted in the wireless device.

15. The system of claim 14, wherein the first SIM card currently inserted in the wireless device enables usage of a first wireless network and the second SIM card enables usage of a second wireless network.

16. The system of claim 12, wherein the processor is further configurable to periodically request to receive the first device identifier and the first SIM identifier associated with the wireless device.

17. The system of claim 12, wherein the first device identifier and the first SIM identifier associated with the wireless device are received upon activation of the wireless device.

18. The system of claim 12, wherein the listing of service licenses associated with the first device identifier is stored in the database as a subscriber service profile.

19. The system of claim 12, wherein the processor is further configurable to replace the listing of service licenses associated with the first device identifier with the aggregate listing of service licenses in the database, as a new listing of service licenses associated with the first device identifier.

20. The system of claim 12, wherein the processor is further configurable to:
determine whether the first SIM identifier is currently associated with a second device identifier identifying a second wireless device; and
if the first SIM identifier is currently associated with the second device identifier:
identify the service licenses associated with the first SIM identifier;
remove the service licenses associated with the first SIM identifier from a listing of service licenses associated with the second device identifier; and
disassociate the second device identifier with the service licenses associated with the first SIM identifier.

21. The system of claim 20, wherein the processor is further configurable to deauthorize the second wireless device from using service licenses associated with the first SIM identifier.

22. The system of claim 12, wherein the processor is further configurable to:
determine that a second SIM card having a second SIM identifier, has been inserted into a second wireless device; and determine that the second SIM identifier is currently associated with the first device identifier;

identify all service licenses associated with the second SIM identifier; and disassociate the service licenses associated with the second SIM identifier from the aggregate listings of service licenses associated with the first device identifier.

23. A computer program product for associating service licenses with a wireless device, the computer program product comprising a non-transitory computer readable storage medium having program instructions embodied therewith, the program instructions executable by a device to cause the device to perform a method comprising:

receiving, at the device, a first device identifier identifying the wireless device and a Subscriber Identity Module (SIM) identifier identifying a first SIM card currently inserted in the wireless device;

determining whether the first SIM identifier is currently associated with the first device identifier; and if the first SIM identifier is not currently associated with the first device identifier:

aggregating a listing of service licenses associated with the SIM identifier with a listing of all service licenses currently associated with the first device identifier, the services licenses associated with multiple SIM cards previously inserted in the wireless device while being provided service by a service provider and not subsequently inserted into a second wireless device being provided service by a service provider, to create an aggregate listing of service licenses; and associating the first device identifier with the aggregate listing of service licenses.

* * * * *